US012802878B2

(12) United States Patent
Otani et al.

(10) Patent No.: US 12,802,878 B2
(45) Date of Patent: Nov. 17, 2026

(54) MULTILAYER CERAMIC CAPACITOR INCLUDING INNER ELECTRODE INCLUDING MAIN FACING PORTION AND THIN PORTION

(71) Applicant: Murata Manufacturing Co., Ltd., Nagaokakyo (JP)

(72) Inventors: Shinji Otani, Nagaokakyo (JP); Kazuhiko Higashide, Nagaokakyo (JP); Daichi Taniguchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 141 days.

(21) Appl. No.: 18/786,664

(22) Filed: Jul. 29, 2024

(65) Prior Publication Data

US 2024/0387106 A1 Nov. 21, 2024

Related U.S. Application Data

(63) Continuation of application No. PCT/JP2023/010658, filed on Mar. 17, 2023.

(30) Foreign Application Priority Data

Mar. 28, 2022 (JP) ................................ 2022-052046

(51) Int. Cl.
*H01G 4/012* (2006.01)
*H01G 4/008* (2006.01)
(Continued)

(52) U.S. Cl.
CPC ............ *H01G 4/012* (2013.01); *H01G 4/008* (2013.01); *H01G 4/12* (2013.01); *H01G 4/232* (2013.01); *H01G 4/30* (2013.01)

(58) Field of Classification Search
None
See application file for complete search history.

(56) References Cited

U.S. PATENT DOCUMENTS 6,278,602 B1 * 8/2001 Haratani .................. H01G 4/30 361/306.3
2007/0025055 A1 * 2/2007 Mizuno .................. H01G 4/015 361/303

(Continued)

FOREIGN PATENT DOCUMENTS

JP H06163311 A 6/1994
JP H09190947 A * 7/1997

(Continued)

OTHER PUBLICATIONS

Translation KR 20150096909 (no date).*

(Continued)

*Primary Examiner* — Eric W Thomas
(74) *Attorney, Agent, or Firm* — Keating & Bennett, LLP

(57) ABSTRACT

A multilayer ceramic capacitor includes a multilayer body including a dielectric layer and an inner electrode alternately laminated, first and second main surfaces opposed to each other in a lamination direction, first and second side surfaces opposed to each other in a width direction orthogonal or substantially orthogonal to the lamination direction, and first and second end surfaces opposed to each other in a length direction orthogonal or substantially orthogonal to the lamination direction and the width direction, and, on each of the first and second end surfaces, an outer electrode coupled to the inner electrode. The inner electrode includes a main facing portion and a thin portion, a thickness of the thin portion is smaller than a thickness of the main facing portion, and the thin portion extends from an end portion of the main facing portion in the width direction to the first or second side surface.

20 Claims, 5 Drawing Sheets

(51) Int. Cl.

| | |
|---|---|
| ***H01G 4/12*** | (2006.01) |
| ***H01G 4/232*** | (2006.01) |
| ***H01G 4/30*** | (2006.01) |

(56) References Cited

U.S. PATENT DOCUMENTS

| | | | | |
|---|---|---|---|---|
| 2011/0141659 | A1 | 6/2011 | Chang et al. | |
| 2015/0096909 | A2* | 4/2015 | Shafer | G01T 1/105 206/316.1 |
| 2015/0116898 | A1 | 4/2015 | Takashima et al. | |
| 2015/0155098 | A1* | 6/2015 | Yamaguchi | H01G 13/00 156/89.16 |
| 2019/0096584 | A1* | 3/2019 | Hong | H01G 13/00 |
| 2020/0105468 | A1 | 4/2020 | Hashimoto et al. | |
| 2021/0313114 | A1* | 10/2021 | Kim | H01G 4/1227 |

FOREIGN PATENT DOCUMENTS

| | | | | | |
|---|---|---|---|---|---|
| JP | 2002329638 | A | | 11/2002 | |
| JP | 2009164446 | A | | 7/2009 | |
| JP | 2011129917 | A | | 6/2011 | |
| JP | 2018046086 | A | | 3/2018 | |
| JP | 2020053577 | A | | 4/2020 | |
| KR | 20150050421 | A | | 5/2015 | |
| KR | 20150096909 | A | * | 8/2015 | H01G 4/30 |

OTHER PUBLICATIONS

Translation JP H09190947 A (no date).*

International Search Report in PCT/JP2023/010658, mailed May 30, 2023, 3 pages.

Written Opinion in PCT/JP2023/010658, mailed May 30, 2023, 3 pages.

* cited by examiner

FIG. 5

| | | | INNER ELECTRODE | THIN PORTION | | QUALITY | |
|---|---|---|---|---|---|---|---|
| No. | | FILLING OF DIELECTRIC PASTE | BENDING AMOUNT (a/b) | AVERAGE THICKNESS (THIN PORTION/MAIN FACING PORTION) | AVERAGE LENGTH (W2/W3) | ELECTRICAL CHARACTERISTICS FAILURE OCCURRENCE RATE | STRUCTURAL FLAW OCCURRENCE RATE AFTER FIRING |
| COMPARATIVE EXAMPLE | 1 | NO | 15 | NO THIN PORTION | NO THIN PORTION | DEFECTIVE | GOOD |
| COMPARATIVE EXAMPLE | 2 | NO | 10 | NO THIN PORTION | NO THIN PORTION | DEFECTIVE | GOOD |
| COMPARATIVE EXAMPLE | 3 | YES | 5 | NO THIN PORTION | NO THIN PORTION | GOOD | DEFECTIVE |
| COMPARATIVE EXAMPLE | 4 | YES | 3 | NO THIN PORTION | NO THIN PORTION | GOOD | DEFECTIVE |
| COMPARATIVE EXAMPLE | 5 | YES | 1 | NO THIN PORTION | NO THIN PORTION | GOOD | DEFECTIVE |
| EXAMPLE | 1 | YES | 5 | 0.4 | 0.1 | GOOD | GOOD |
| EXAMPLE | 2 | YES | 3 | 0.4 | 0.1 | GOOD | GOOD |
| EXAMPLE | 3 | YES | 1 | 0.4 | 0.1 | GOOD | GOOD |
| EXAMPLE | 4 | YES | 5 | 0.3 | 0.1 | GOOD | GOOD |
| EXAMPLE | 5 | YES | 5 | 0.2 | 0.1 | GOOD | GOOD |
| EXAMPLE | 6 | YES | 5 | 0.1 | 0.1 | GOOD | GOOD |
| EXAMPLE | 7 | YES | 5 | 0.4 | 0.2 | GOOD | GOOD |
| EXAMPLE | 8 | YES | 5 | 0.4 | 0.3 | GOOD | GOOD |
| EXAMPLE | 9 | YES | 5 | 0.4 | 0.4 | GOOD | GOOD |
| EXAMPLE | 10 | YES | 5 | 0.4 | 0.5 | GOOD | GOOD |
| EXAMPLE | 11 | YES | 5 | 0.4 | 0.6 | GOOD | GOOD |

MULTILAYER CERAMIC CAPACITOR INCLUDING INNER ELECTRODE INCLUDING MAIN FACING PORTION AND THIN PORTION

CROSS REFERENCE TO RELATED APPLICATIONS

This application claims the benefit of priority to Japanese Patent Application No. 2022-052046 filed on Mar. 28, 2022 and is a Continuation Application of PCT Application No. PCT/JP2023/010658 filed on Mar. 17, 2023. The entire contents of each application are hereby incorporated herein by reference.

BACKGROUND OF THE INVENTION

1. Field of the Invention

The present invention relates to multilayer ceramic capacitors.

2. Description of the Related Art

There has been a demand for making a multilayer ceramic capacitor smaller in recent years. When a mechanical force is applied to such a small multilayer ceramic capacitor, a crack may occur in a dielectric, and inner electrodes may be short-circuited.

To cope with the problem described above, Japanese Unexamined Patent Application Publication No. 6-163311 discloses a multilayer ceramic capacitor described below. The multilayer ceramic capacitor includes a plurality of first inner electrodes and a plurality of second inner electrodes coupled to a first outer electrode and a second outer electrode, respectively. A sum of a length of the first inner electrode toward the second outer electrode and a length of a second lower surface outer electrode toward the first outer electrode is shorter than a distance between the first outer electrode and the second outer electrode, and a sum of a length of the second inner electrode toward the first outer electrode and a length of a first lower surface outer electrode toward the second outer electrode is shorter than the distance between the first outer electrode and the second outer electrode.

However, in Japanese Unexamined Patent Application Publication No. 6-163311, a crack occurring during firing is not considered.

There has been a demand for a multilayer ceramic capacitor to have a large capacitance in recent years. In order to cope with the demand, an inner electrode included in the multilayer body is maximized, and as a result, a dielectric layer covering the inner electrode is minimized.

As a result, a crack may occur in the minimized dielectric layer covering the inner electrode during firing. The crack causes a decrease in reliability such as moisture resistance reliability.

SUMMARY OF THE INVENTION

Example embodiments of the present invention provide multilayer ceramic capacitors in each of which a crack due to firing is less likely to occur.

A multilayer ceramic capacitor according to an example embodiment of the present invention includes a multilayer body in which a dielectric layer and an inner electrode are alternately laminated. The multilayer body includes a first main surface and a second main surface opposed to each other in a lamination direction, a first side surface and a second side surface opposed to each other in a width direction orthogonal or substantially orthogonal to the lamination direction, and a first end surface and a second end surface opposed to each other in a length direction orthogonal or substantially orthogonal to the lamination direction and the width direction. The multilayer body includes an outer electrode on each of the first end surface and the second end surface, the outer electrode being coupled to the inner electrode, the inner electrode includes a main facing portion and a thin portion, a thickness of the thin portion is smaller than a thickness of the main facing portion, and the thin portion extends from an end portion of the main facing portion in the width direction to the first side surface or the second side surface.

According to example embodiments of the present invention, the multilayer ceramic capacitors described above may each be easily provided.

The above and other elements, features, steps, characteristics and advantages of the present invention will become more apparent from the following detailed description of the example embodiments with reference to the attached drawings.

BRIEF DESCRIPTION OF THE DRAWINGS

FIG. 5 is a table describing details of an example and a comparative example.

DETAILED DESCRIPTION OF THE EXAMPLE EMBODIMENTS

Figure 1:
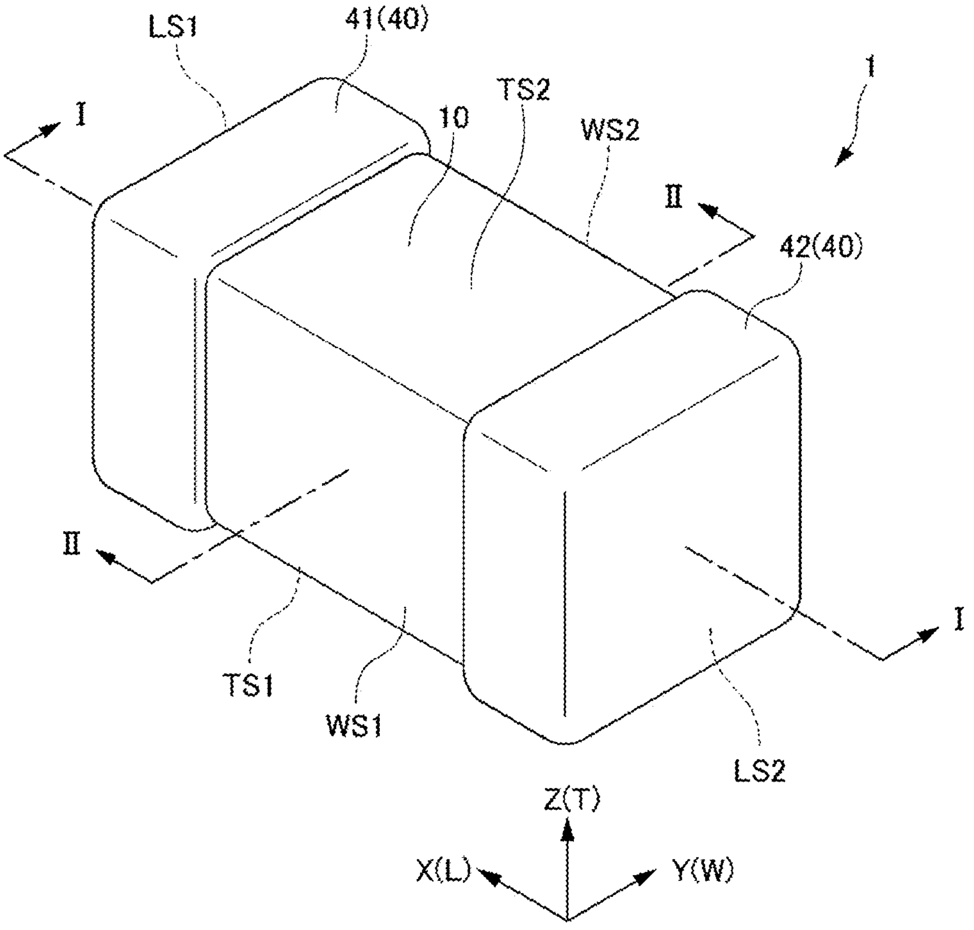
FIG. 1 is a perspective view of a multilayer ceramic capacitor according to an example embodiment of the present invention.

Hereinafter, example embodiments of the present invention will be described with reference to the accompanying drawings. In the drawings, the same or corresponding portions are denoted with the same reference signs.

Outline of Multilayer Structure

Figure 2:
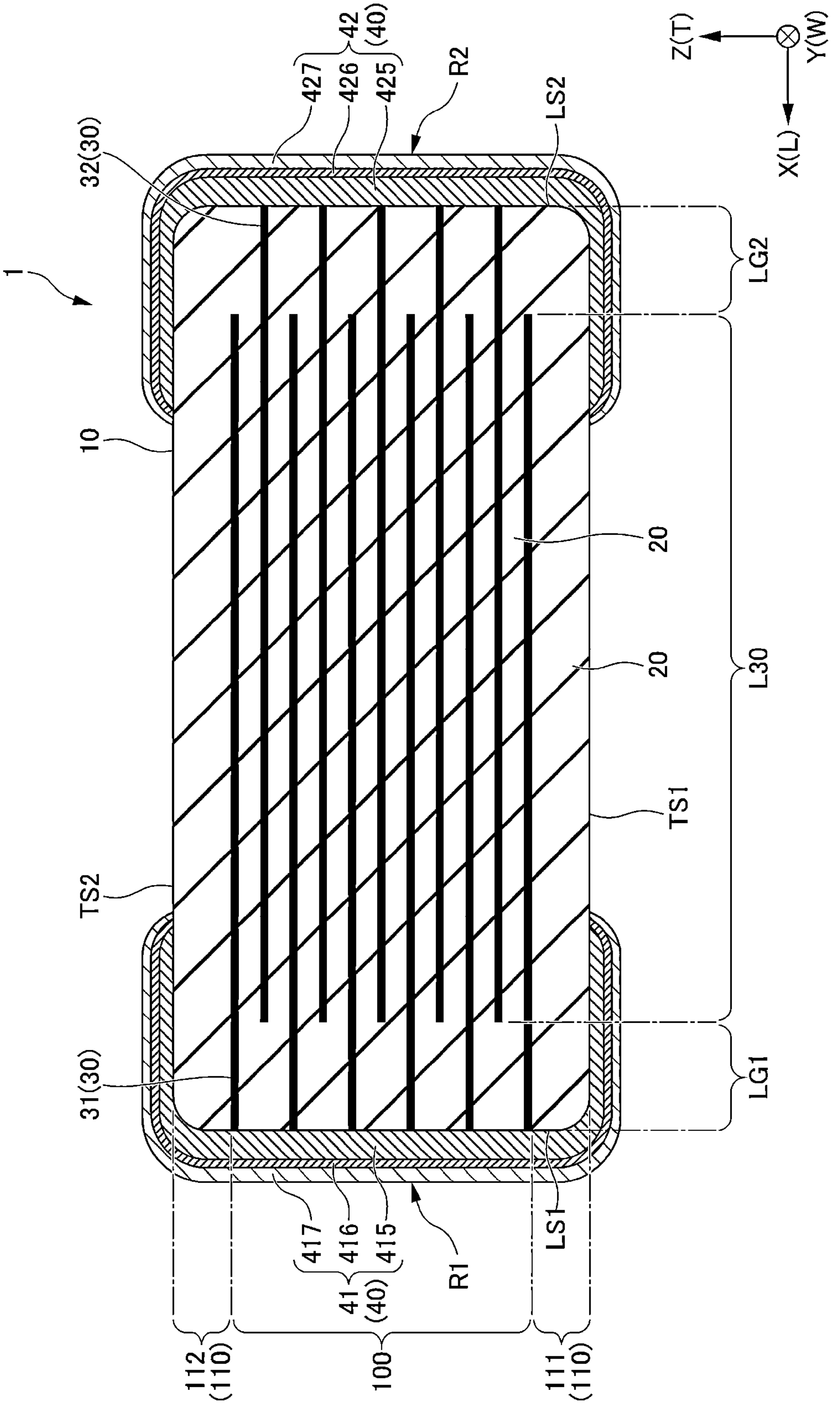
FIG. 2 is a sectional view of the multilayer ceramic capacitor taken along line I-I in FIG. 1.
Figure 3:
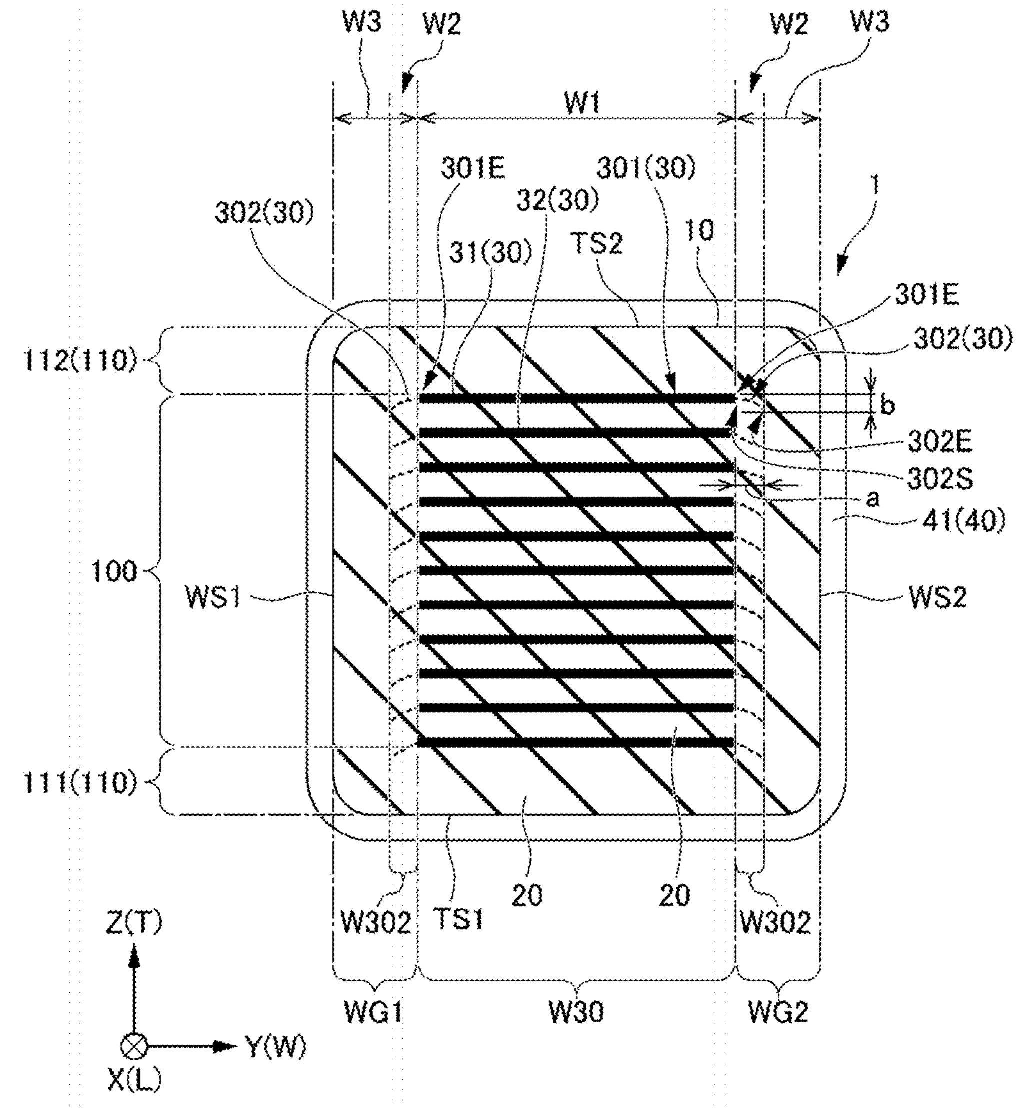
FIG. 3 is a sectional view of the multilayer ceramic capacitor taken along line II-II in FIG. 1.

FIG. 1 is a perspective view of a multilayer ceramic capacitor according to an example embodiment of the present invention, FIG. 2 is a sectional view of the multilayer ceramic capacitor taken along line I-I in FIG. 1, and FIG. 3 is a sectional view of the multilayer ceramic capacitor taken along line II-II in FIG. 1. A multilayer ceramic capacitor 1 illustrated in FIG. 1 to FIG. 3 includes a multilayer body 10 and an outer electrode 40. The outer electrode 40 includes a first outer electrode 41 and a second outer electrode 42.

Definition of Direction

An XYZ orthogonal coordinate system is illustrated in FIG. 1 to FIG. 3. An X direction is a length direction L of the multilayer ceramic capacitor 1 and the multilayer body 10, a Y direction is a width direction W of the multilayer ceramic capacitor 1 and the multilayer body 10, and a Z direction is a lamination direction T of the multilayer ceramic capacitor 1 and the multilayer body 10. Accordingly, a section illustrated in FIG. 2 is also referred to as an LT section, and a section illustrated in FIG. 3 is also referred to as a WT section.

The length direction L, the width direction W, and the lamination direction T are not necessarily in a relationship of being orthogonal or substantially orthogonal to each other and may be in a relationship of intersecting with each other.

Multilayer Body

As illustrated in FIG. 1, the multilayer body 10 has a rectangular or substantially rectangular parallelepiped shape, and includes a first main surface TS1 and a second main surface TS2 opposed to each other in the lamination direction T, a first side surface WS1 and a second side surface WS2 opposed to each other in the width direction W, and a first end surface LS1 and a second end surface LS2 opposed to each other in the length direction L.

A corner portion and a ridge portion of the multilayer body 10 each are preferably rounded. The corner portion is a portion where three surfaces of the multilayer body 10 meet, and the ridge portion is a portion where two surfaces of the multilayer body 10 meet.

As illustrated in FIG. 2, the multilayer body 10 includes a plurality of dielectric layers 20 and a plurality of inner electrodes 30 that are laminated in the lamination direction T.

The inner electrodes 30 include a first inner electrode 31 coupled to the first outer electrode 41 and a second inner electrode 32 coupled to the second outer electrode 42.

The multilayer body 10 includes an inner layer portion 100 and two outer layer portions 110 disposed to sandwich the inner layer portion 100 in the lamination direction T.

Inner Layer Portion

The inner layer portion 100 includes the plurality of inner electrodes 30 and a portion of the plurality of dielectric layers 20. In the inner layer portion 100, the plurality of inner electrodes 30 face each other with the dielectric layer 20 interposed therebetween. The inner layer portion 100 is a portion that generates electrostatic capacitance and substantially defines and functions as a capacitor.

Outer Layer Portion

Of the two outer layer portions 110 described above, the outer layer portion 110 disposed on the first main surface TS1 side is a first outer layer portion 111, and the outer layer portion 110 disposed on the second main surface TS2 side is a second outer layer portion 112.

Specifically, the first outer layer portion 111 is disposed between the first main surface TS1 and the inner electrode 30 closest to the first main surface TS1 among the plurality of inner electrodes 30. The second outer layer portion 112 is disposed between the second main surface TS2 and the inner electrode 30 closest to the second main surface TS2 among the plurality of inner electrodes 30.

The first outer layer portion 111 and the second outer layer portion 112 each include no inner electrode 30, and each include the dielectric layer 20 excluding the dielectric layer 20 disposed in the inner layer portion 100 among the plurality of dielectric layers 20. The first outer layer portion 111 and the second outer layer portion 112 each define and function as a protection layer for the inner layer portion 100.

Division in Length Direction L

As illustrated in FIG. 2, the multilayer body 10 can be divided into a capacitance generation portion L30, a first end gap portion LG1, and a second end gap portion LG2 in the length direction L.

Capacitance Generation Portion

The capacitance generation portion L30 is a portion where capacitance is generated with the inner electrodes 30 facing each other.

End Gap Portion

The first end gap portion LG1 is a portion between the capacitance generation portion L30 and the first end surface LS1. Meanwhile, the second end gap portion LG2 is a portion between the capacitance generation portion L30 and the second end surface LS2.

The first end gap portion LG1 defines and functions as an extended electrode portion of the first inner electrode 31 to the first end surface LS1, and the second end gap portion LG2 functions as an extended electrode portion of the second inner electrode 32 to the second end surface LS2. The first end gap portion LG1 and the second end gap portion LG2 each are also referred to as an L gap.

Main Facing Portion and Thin Portion of Inner Electrode

As illustrated in FIG. 3, each inner electrode 30 includes a main facing portion 301 and a thin portion 302. More specifically, each of the first inner electrode 31 and the second inner electrode 32 includes the main facing portion 301 and the thin portion 302.

The main facing portion 301 is a portion where one inner electrode 30 faces another inner electrode 30 in the lamination direction T with the dielectric layer 20 interposed therebetween. The main facing portion 301 mainly generates capacitance.

Meanwhile, the thin portion 302 extends from the main facing portion 301, and a film thickness of the thin portion 302 is smaller than that of the main facing portion 301.

Specifically, the thin portion 302 is a peripheral portion of the inner electrode 30, that is, a portion positioned outside of the main facing portion 301 in plan view. In addition to the above, the thin portion 302 is a portion where a thickness thereof is, for example, about 40% or less of a thickness of the main facing portion 301.

Here, the plan view means that the inner electrode 30 is viewed in the lamination direction L.

Further, a thickness of the inner electrode 30 is measured as described in the paragraph "Measurement Method" below. That is, a section of the multilayer body 10 is exposed by polishing and a length of the exposed inner electrode 30 in the lamination direction T is measured under a scanning electron microscope.

More specifically, the thickness of the inner electrode 30 is an average value of the thicknesses of ten layers of the inner electrodes 30 adjacent to each other in the lamination direction T at a center portion in the lamination direction T at a position where the thickness is to be obtained.

The thickness of the main facing portion 301 is measured by the above-described measurement method at a center position of the inner electrode 30 in the length direction L and the width direction W. That is, the thickness of the main facing portion 301 is an average value of the thicknesses of ten layers of inner electrodes 30 adjacent to each other in the lamination direction T at the center portion in the lamination direction T and at the center position of the inner electrode 30 in the length direction L and the width direction W.

An end portion of the main facing portion 301 is referred to as a main facing portion end portion 301E.

As illustrated in FIG. 3, the thin portion 302 extends from each of the two main facing portion end portions 301E toward a corresponding side surface WS in the vicinity.

Division in Width Direction W

A division of the multilayer body 10 in the width direction W will be described with reference to FIG. 3.

A portion of the inner electrodes 30 where the main facing portions 301 face each other in the lamination direction T is a capacitance generation portion W30.

A portion between the capacitance generation portion W30 and the first side surface WS1 is a first side gap portion WG1. A portion between the capacitance generation portion W30 and the second side surface WS2 is a second side gap portion WG2.

Capacitance Generation Portion

The capacitance generation portion W30 is a portion where capacitance is generated with the main facing portions 301 of the inner electrodes 30 facing each other.

Side Gap Portion

The first side gap portion WG1 and the second side gap portion WG2 each include no inner electrode 30 and include only the dielectric layer 20. The first side gap portion WG1 and the second side gap portion WG2 each define and function as a protection layer for the inner electrodes 30. The first side gap portion WG1 and the second side gap portion WG2 each are also referred to as a W gap.

Thin Portion Overlapping Portion

A portion of the inner electrodes 30 where the thin portions 302 face each other in the lamination direction T is referred to as a thin portion overlapping portion W302.

Here, a start point of the thin portion 302 is referred to as a thin portion start point 302S, and an end point of the thin portion 302 is referred to as a thin portion end point 302E. The start point of the thin portion 302 is a point where the thin portion 302 and the main facing portion end portion 301E are in contact with each other. Meanwhile, the end point of the thin portion 302 is an end portion of the thin portion 302 on a side opposite to the start point, and is a point facing the first side surface WS1 or the second side surface WS2.

The thin portion overlapping portion W302 extends, according to the location of the thin portion 302, from each of the two main facing portion end portions 301E, that is, the thin portion start points 302S to a corresponding one of the thin portion end points 302E.

Definition of Length

Here, a length of the capacitance generation portion W30 in the width direction W is denoted as W1, and a length of the thin portion overlapping portion W302 is denoted as W2. A length of the side gap portion WG in the width direction W is denoted as W3.

In the following description, an example configuration is described in which the lengths of the thin portion overlapping portions W302 are the same or substantially the same and lengths of the first side gap portion WG1 and the second side gap portion WG2 are the same or substantially the same on the first side surface WS1 side and on the second side surface WS2 side. The lengths on the first side surface WS1 side and on the second side surface WS2 side may be different from each other.

Figure 4:
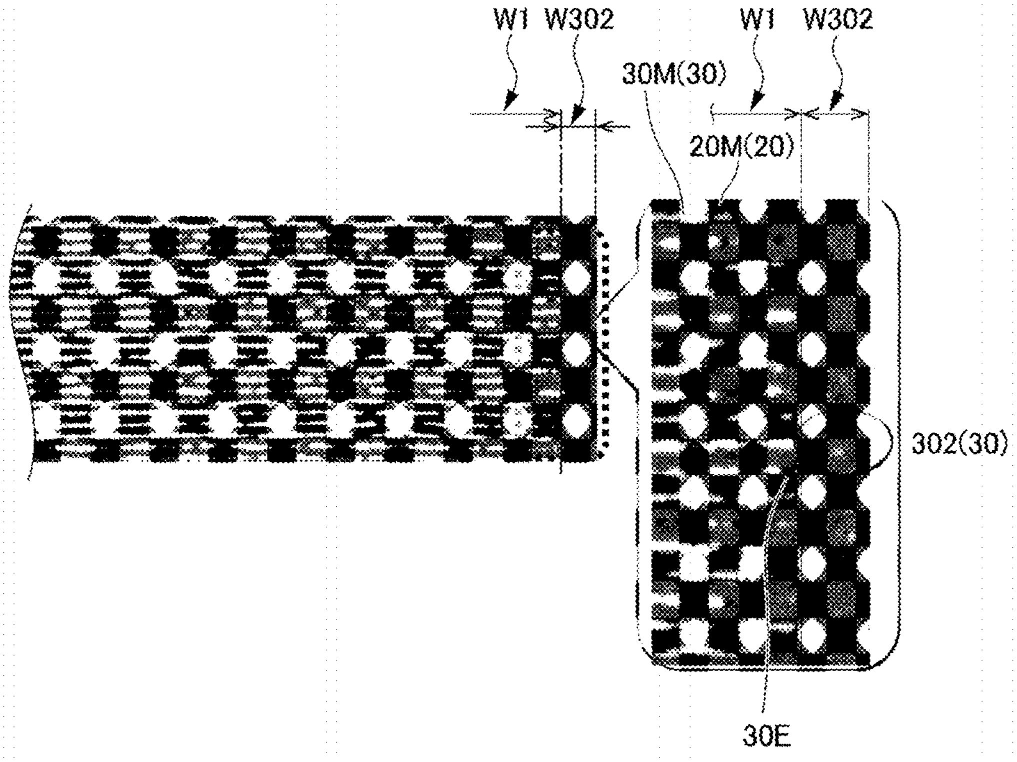
FIG. 4 is a photograph of a section corresponding to portion of the sectional view of the multilayer ceramic capacitor according to the present example embodiment of the present invention taken along line II-II.

The thin portion 302 will be described in detail below. An example of the thin portion 302 is illustrated in FIG. 4. As illustrated in the thin portion overlapping portion W302 of FIG. 4, the thin portion 302 extends in a thread shape from the main facing portion end portion 301E.

Thickness of Thin Portion

The thickness of the thin portion 302 will be described.

The thickness of the thin portion 302 is smaller than that of the main facing portion 301. For example, the thickness of the thin portion 302 is about 40% or less of the thickness of the main facing portion 301. Preferably, for example, the thickness of the thin portion 302 is about 30% or less of the thickness of the main facing portion 301, and more preferably about 20% or less.

Effect

In the multilayer ceramic capacitor 1 of the present example embodiment, the thin portion 302 having the thickness smaller than that of the main facing portion 301 is provided.

As a result, a multilayer ceramic capacitor in which a crack due to firing is less likely to occur may be provided.

As described above, a crack may be generated in the dielectric layer 20 during firing due to difference in characteristics between ceramics and a metal. A crack is more likely to occur when the number of laminated inner electrodes 30 is large and a thickness of the dielectric layer 20 surrounding the inner electrode 30 is small.

In this regard, the multilayer ceramic capacitor 1 of the present example embodiment includes the thin portion 302 having the thickness smaller than that of the main facing portion 301.

By disposing the thin portion in the vicinity of the end portion of the inner electrode 30, shrinkage behavior of the dielectric layer 20 covering the inner electrode 30 may be controlled.

For example, stress may occur between the dielectric layer and the inner electrode during firing. Materials of the dielectric layer and the inner electrode are ceramics and a metal respectively and are different from each other. Thermal shrinkage of ceramics is different from thermal shrinkage of a metal. Because of this, the dielectric layer and the inner electrode may have different degrees of shrinkage during firing and this may cause the stress.

In this regard, in the multilayer ceramic capacitor 1 of the present example embodiment, the stress generated by the shrinkage may be reduced or prevented. As a result, the occurrence of a crack and the occurrence of a structural flaw that may later cause a crack may be reduced.

As described above, the multilayer ceramic capacitor 1 of the present example embodiment may be, for example, the multilayer ceramic capacitor 1 in which a crack due to firing is less likely to occur.

Length of Thin Portion

A length of the thin portion 302 will be described.

The thin portion 302 extends from the main facing portion end portion 301E toward the first side surface WS1 or the second side surface WS2. The thin portion 302 does not extend to be in contact with the first side surface WS1 or the second side surface WS2.

The length W2 of the thin portion 302 in the width direction W illustrated in FIG. 3 is, for example, about 10% or more of the length W3 of the side gap portion WG. Preferably, for example, the length W2 is about 20% or more, more preferably about 30% or more, and even more preferably about 40% or more of the length W3.

By setting a length of the length W2 in the above-described range, the multilayer ceramic capacitor 1 in which a crack due to firing is less likely to occur may be more reliably provided.

The length of the thin portion 302 described above means an average length of the plurality of thin portions 302. The average length may be an average value of ten thin portions 302 adjacent to each other, for example.

Linearity of Thin Portion

The linearity of the thin portion 302 will be described.

As illustrated in FIG. 3 and FIG. 4, the thin portion 302 does not necessarily extend linearly in the width direction W. The thin portion 302 may be curved toward the first main surface TS1, for example.

Meanwhile, the main facing portion 301 extends linearly or substantially linearly in the width direction W. That is, the main facing portion 301 has higher linearity than the thin portion 302.

As illustrated in FIG. 3, a length from the thin portion start point 302S to the thin portion end point 302E of the thin portion 302 in the width direction W is denoted as a. A length of a range where the inner electrode 30 including the main facing portion 301 and the thin portion 302 exists in the lamination direction T is denoted as b. The length a is a value representing the length of the thin portion 302 in the width direction W and is the same as the length W2 described above.

Bending Amount

Here, the length a/length b is defined as a bending amount.

The bending amount is, for example, preferably about 0.5 or more and about 9.0 or less. The bending amount is, for example, more preferably about 1.0 or more and about 5.0 or less.

When the bending amount exceeds about 9.0, it is more likely that the inner electrode 30 is in contact with another inner electrode 30 adjacent in the lamination direction T, and a short circuit occurs.

Meanwhile, when the bending amount is less than about 0.5, control of the shrinkage behavior of the dielectric layer 20 covering the inner electrode 30 becomes insufficient. As a result, the occurrence of a crack due to firing is not sufficiently reduced.

The length b may appropriately be set in consideration of a size of the multilayer ceramic capacitor 1, or the like. For example, the length b may be made about 10 μm.

Continuity

Next, continuity will be described.

Continuity is a ratio of a length of a portion where a conductive material is actually present per unit length in the inner electrode 30.

The conductive material of the inner electrode 30 is illustrated as a conductive material 30M in FIG. 4. A material of the dielectric is illustrated as a dielectric material 20M.

As illustrated in FIG. 4, the conductive material 30M is not continuously provided in the inner electrode 30. The conductive material 30M extends in a discontinuous manner with the dielectric material 20M in between.

A ratio of the conductive material 30M in a net length of the inner electrode 30 is defined as the continuity.

As illustrated in FIG. 4, the continuity of the thin portion 302 is lower than the continuity of the main facing portion 301 in the inner electrode 30.

The conductive material 30M occupies most of the main facing portion 301, whereas the dielectric material 20M occupies a larger proportion than the conductive material 30M in the thin portion 302.

Advantageous Effects

The multilayer ceramic capacitor 1 of the present example embodiment has lower continuity in the thin portion 302 than in the main facing portion 301.

As a result, the shrinkage behavior of the dielectric layer 20 covering the inner electrode 30 is easily controlled. Thus, it is possible to effectively reduce the occurrence of a crack and the occurrence of a structural flaw that may later cause a crack.

The continuity of the inner electrode 30 described above may be evaluated by an average in the plurality of inner electrodes 30. For example, the continuity may be evaluated by an average of those of ten main facing portions 301 adjacent to each other or those of ten thin portions 302 adjacent to each other.

Method of Forming Thin Portion

An example of a method of forming the thin portion 302 will be described. An example of a method of manufacturing the entire multilayer ceramic capacitor will be described later.

The method of forming the thin portion 302 includes a method to apply a conductive material corresponding to the thin portion by printing at the same time when an electrode material is applied to a dielectric sheet by printing, for example.

Alternatively, the method of forming the thin portion 302 includes a method of adding a conductive material to a dielectric paste for thickness correction and applying the dielectric paste to the multilayer body before firing.

First, there will be described the former method to apply a conductive material by printing at the same time when an electrode material is applied by printing.

For example, when a pattern of the inner electrode is printed on a dielectric sheet for the inner layer portion 100, a pattern of the thin portion 302 is printed in addition to a pattern of the main facing portion 301. The printing method is not particularly limited and may be, for example, screen printing, gravure printing, or the like.

A printing plate is formed so that an electrode included in the thin portion 302 has a desired length and desired continuity. A conductive material is applied by, for example, printing on a dielectric sheet using the plate described above. Thereafter, firing and the like based on a typical method of manufacturing a multilayer ceramic capacitor are performed.

Thus, the multilayer ceramic capacitor 1 including the thin portion 302 may be obtained.

Next, there will be described an example of a method of adding a conductive material to a dielectric paste for thickness correction and applying the dielectric paste to the multilayer body before firing.

When the dielectric sheets on which the patterns of the inner electrodes are printed are laminated, a thickness of a laminate in a portion where the inner electrodes are overlapped may be different from a thickness of the laminate in a portion where the inner electrodes are not present.

For example, the multilayer body before firing may be smaller in thickness in a portion corresponding to the first side gap portion WG1 than in a portion corresponding to the capacitance generation portion W30 illustrated in FIG. 3. In the case above, the thickness of the laminate may be adjusted by applying the dielectric paste to a portion corresponding to the first side gap portion WG1.

A conductive material is added to the dielectric paste. The dielectric paste including the conductive material is applied to the portion, which is small in thickness, corresponding to the first side gap portion WG1 of the multilayer body. The first side gap portion WG1 corresponds to a portion where the thin portion 302 is formed.

The application can be performed by a printing method such as screen printing, for example. At this time, an application position, an application amount, an addition amount of the conductive material, and the like are adjusted so that the electrode included in the thin portion 302 has a desired length and desired continuity.

Thereafter, firing and the like based on a typical method of manufacturing a multilayer ceramic capacitor are performed.

Thus, the multilayer ceramic capacitor 1 including the thin portion 302 may be obtained.

In any of the above-described methods, the thin portion 302 may be formed to have a desired curvature by adjusting a thickness distribution of the dielectric sheet and the amount of the dielectric paste applied.

Materials of the respective portions will be described below.

Material of Inner Electrode

The inner electrode 30 includes a metal Ni as a main component, for example. Further, the inner electrode 30 may include, as a main component or as a component other than the main component, for example, at least one metal, such as, for example, Cu, Ag, Pd, and Au, or alloys, such as an Ag—Pd alloy, including at least one of the metals. Furthermore, the inner electrode 30 may include, as a component other than the main component, a dielectric particle having a composition based on the same composition as ceramics included in the dielectric layer 20. In the present description, a main component metal is defined as a metal component having the highest mass %.

Solid Solution Layer

In a case that, for example, Ni is a first metal component, a solid solution layer (not illustrated), in which a second metal component different from the first metal component is solid-dissolved, may be provided at interfaces with the dielectric layer 20 or the outer layer portion 110 on both sides of the inner electrode 30 in the lamination direction T. The solid solution layer includes a central solid solution layer (not illustrated) and an outer solid solution layer (not illustrated).

The second metal component is, for example, preferably Sn, In, Ga, Zn, Bi, Pb, Fe, V, Y or Cu, and is particularly preferably Sn. Hereinafter, a description will be made with the second metal component being Sn.

The solid solution layer is a layer in which Sn atoms are randomly substituted for Ni in an atomic arrangement structure of Ni while maintaining the atomic arrangement structure of Ni. A thickness of the solid solution layer is, for example, preferably about 1 nm or more and about 20 nm or less.

The solid solution layer may be provided at interfaces on both sides of the inner electrode 30 in the lamination direction T, but the configuration is not limited thereto, and the solid solution layer may be provided only at an interface on one side of the inner electrode 30 in the lamination direction T. The solid solution layer is provided to all of the inner electrodes 30, but the configuration is not limited thereto, and the solid solution layer may be provided to only some of the inner electrodes 30.

Central Solid Solution Layer

The central solid solution layer is provided at an interface between the inner electrode 30 and the dielectric layer 20 or the outer layer portion 110, in a central region of the multilayer body 10 in the length direction L and the width direction W. Sn is solid-dissolved to Ni in a larger ratio in the central solid solution layer than in the outer solid solution layer. Here, the interface is not only a boundary but also a region which may include a portion of the inner electrode 30 and a portion of the dielectric layer 20 or the outer layer portion 110.

The central solid solution layer may be, for example, a region that is about 10 μm inside from an end portion of the main facing portion 301 in the length direction L and an end portion of the main facing portion 301 in the width direction W.

In the central solid solution layer, for example, Sn is preferably solid-dissolved with a molar amount of about 0.008 or more and about 0.025 or less, and preferably about 0.02, relative to a total molar amount of Ni and Sn, that is, with about 2 mol %. The ratio of Sn to Ni is a value obtained by measuring 10 points with TEM analysis at the interfaces of the center portion in the lamination direction T, a center portion in the width direction W, and a center portion in the length direction L, and averaging the measured values.

Outer Solid Solution Layer

The outer solid solution layer is provided in a region surrounding the central solid solution layer in the main facing portion 301. That is, the outer solid solution layer is a region that is, for example, up to about 10 μm inside from the end portion of the main facing portion 301 in the length direction L and the end portion of the main facing portion 301 in the width direction W.

In the outer solid solution layer, for example, Sn is preferably solid-dissolved with molar amount of about 0.008 or more and about 0.025 or less, and preferably about 0.02, relative to a total molar amount of Ni and Sn, that is, with about 0.5 mol %.

Thickness and Number of Inner Electrodes

The thickness of the inner electrode 30 is not particularly limited, but may be about 0.4 μm or more and about 1.5 μm or less, for example. The number of the inner electrodes 30 is not particularly limited, but is preferably 20 or more and 1000 or less, for example.

Material of Dielectric

The plurality of dielectric layers 20 are made of a dielectric material. The dielectric material may be dielectric ceramics including components such as $BaTiO_3$, $CaTio_3$, $SrTiO_3$, or $CaZrO_3$, for example. Further, the dielectric material may be a material obtained by adding a secondary component such as, for example, a Mn compound, an Fe compound, a Cr compound, a Co compound, or a Ni compound to the main component above.

Thickness and Material of Dielectric Layer

The thickness of the dielectric layer 20 is not particularly limited, but is preferably about 0.5 μm or more and about 3.0 μm or less, for example.

The number of dielectric layers 20 is not particularly limited, but is preferably 20 or more and 1000 or less, for example. The number of the dielectric layers 20 is the total number of the dielectric layers 20 of the inner layer portion 100 and the dielectric layers 20 of the outer layer portion 110.

Measurements of Multilayer Body

Measurements of the multilayer body 10 described above are not particularly limited, but, for example, it is preferable that a length in the length direction L is about 1.55 mm or more and about 1.65 mm or less, a width in the width direction W is about 0.75 mm or more and about 0.85 mm or less, and a thickness in the lamination direction T is about 0.75 mm or more and about 0.85 mm or less.

Outer Electrode

Next, the outer electrode 40 will be described.

The outer electrode 40 includes the first outer electrode 41 and the second outer electrode 42.

The first outer electrode 41 is disposed on the first end surface LS1 of the multilayer body 10 and coupled to the first inner electrode 31. The first outer electrode 41 may extend from the first end surface LS1 to a portion of the first main surface TS1 and a portion of the second main surface TS2. The first outer electrode 41 may extend from the first end surface LS1 to a portion of the first side surface WS1 and a portion of the second side surface WS2.

The second outer electrode 42 is disposed on the second end surface LS2 of the multilayer body 10 and coupled to the second inner electrode 32. The second outer electrode 42 may extend from the second end surface LS2 to a portion of the first main surface TS1 and a portion of the second main surface TS2. The second outer electrode 42 may extend from the second end surface LS2 to a portion of the first side surface WS1 and a portion of the second side surface WS2.

The first outer electrode 41 includes a first base electrode 415, a first inner plating layer 416, and a first front plating layer 417. The second outer electrode 42 includes a second base electrode 425, a second inner plating layer 426, and a second front plating layer 427.

Base Electrode

The first base electrode 415 is disposed on the first end surface LS1 of the multilayer body 10 and covers the first end surface LS1 of the multilayer body 10. The first base electrode 415 may extend from the first end surface LS1 to a portion of the first main surface TS1, a portion of the second main surface TS2, a portion of the first side surface WS1, and a portion of the second side surface WS2.

The second base electrode 425 is disposed on the second end surface LS2 of the multilayer body 10 and covers the second end surface LS2 of the multilayer body 10. The second base electrode 425 may extend from the second end surface LS2 to a portion of the first main surface TS1, a portion of the second main surface TS2, a portion of the first side surface WS1, and a portion of the second side surface WS2.

The first base electrode 415 and the second base electrode 425 each may be, for example, a fired layer including a metal and glass. The glass includes a glass component including, for example, at least one selected from B, Si, Ba, Mg, Al, Li, and the like. As a specific example, borosilicate glass may be used. The metal includes, for example, Cu as a main component. Further, the metal may include, as a main component or as a component other than the main component, for example, at least one selected from metals such as Ni, Ag, Pd, and Au, or alloys such as an Ag—Pd alloy.

The fired layer is a layer obtained by applying a conductive paste including a metal and glass to the multilayer body with a dip method and firing the paste, for example. The firing may be performed after the firing of the inner electrode or may be performed simultaneously with the firing of the inner electrode. The fired layer may be a plurality of layers.

Alternatively, the first base electrode 415 and the second base electrode 425 each may be, for example, a resin layer including a conductive particle and a thermosetting resin. The resin layer may be formed on the fired layer described above, or may be directly formed on the multilayer body without forming the fired layer.

The resin layer is a layer obtained by applying a conductive paste including a conductive particle and a thermosetting resin to the multilayer body with an applying method, and firing the conductive paste, for example. The firing may be performed after the firing of the inner electrode or may be performed simultaneously with the firing of the inner electrode. The resin layer may be a plurality of layers.

A thickness of one layer of each of the first base electrode 415 and the second base electrode 425 as the fired layer or the resin layer is not particularly limited, and may be about 1 μm or more and about 10 μm or less, for example.

Alternatively, the first base electrode 415 and the second base electrode 425 may be formed with a thin film forming method such as, for example, a sputtering method or a vapor deposition method and may be a thin film layer of, for example, about 1 μm or less in which metal particles are deposited.

Inner Plating Layer

The first inner plating layer 416 is disposed on the first base electrode 415 and covers at least a portion of the first base electrode 415. The second inner plating layer 426 is disposed on the second base electrode 425 and covers at least a portion of the second base electrode 425. The first inner plating layer 416 and the second inner plating layer 426 each include, for example, at least one selected from metals such as Cu, Ni, Ag, Pd, and Au, or alloys such as an Ag—Pd alloy.

Front Plating Layer

The first front plating layer 417 is disposed on the first inner plating layer 416 and covers at least a portion of the first inner plating layer 416. The second front plating layer 427 is disposed on the second inner plating layer 426 and covers at least a portion of the second inner plating layer 426. The first front plating layer 417 and the second front plating layer 427 each include a metal such as Sn, for example.

Roles of Inner Plating Layer and Front Plating Layer

Preferably, for example, the first inner plating layer 416 and the second inner plating layer 426 each are a Ni plating layer, and the first front plating layer 417 and the second front plating layer 427 each are a Sn plating layer. The Ni plating layer may prevent the base electrode from being eroded by solder when a ceramic electronic component is mounted, and the Sn plating layer may improve wettability of solder when a ceramic electronic component is mounted, and thus a ceramic electronic component may easily be mounted.

In other words, the first inner plating layer 416 and the second inner plating layer 426 have lower solder wettability than the first front plating layer 417 and the second front plating layer 427.

Thickness of Plating Layer

A thickness of first plating layers 416 and 417 including the first inner plating layer 416 and the first front plating layer 417 is not particularly limited, and may be about 1 μm or more and about 10 μm or less, for example. A thickness of second plating layers 426 and 427 including the second inner plating layer 426 and the second front plating layer 427 is not particularly limited, and may be about 1 μm or more and about 10 μm or less, for example.

With this, the maximum value of a total length of the multilayer body 10 and the two outer electrodes 41 and 42 in the length direction L may be about 1.75 mm or more and about 1.85 mm or less, for example.

Measurement Method

Next, an example of a measurement method will be described in order.

Measurement methods of the thicknesses of the dielectric layer 20 and the electrode include observing an LT section in the vicinity of the center in the width direction of the multilayer body exposed by polishing under a scanning electron microscope, for example. Each value may be an average value of measured values at a plurality of positions in the length direction, or may be an average value of measured values at a plurality of positions in the lamination direction. In particular, measurement of a film thickness of the inner electrode 30 is evaluated by an average in the above-described measurement range.

Similarly, measurement methods of a thickness of the multilayer body 10 include observing the LT section in the vicinity of the center in the width direction of the multilayer body exposed by polishing, or a WT section in the vicinity of the center in the length direction of the multilayer body exposed by polishing under a scanning electron microscope, for example. Each value may be an average value of measured values at a plurality of positions in the length direction or the width direction.

Similarly, measurement methods of a length of the multilayer body 10 include observing the LT section in the vicinity of the center in the width direction of the multilayer body exposed by polishing under a scanning electron microscope, for example. Each value may be an average value of measured values at a plurality of positions in the lamination direction.

Similarly, measurement methods of a width of the multilayer body 10 include observing the WT section in the vicinity of the center in the length direction of the multilayer body exposed by polishing under a scanning electron microscope, for example. Each value may be an average value of measured values at a plurality of positions in the lamination direction.

Manufacturing Method

Next, an example of a method of manufacturing the above-described multilayer ceramic capacitor 1 will be described. First, a dielectric sheet for the dielectric layer 20 and a conductive paste for the inner electrode 30 are prepared. The dielectric sheet and the conductive paste each include a binder and a solvent. As the binder and the solvent, known materials may be used.

Next, the conductive paste is applied on a dielectric sheet by printing in a predetermined pattern, for example, to form an inner electrode pattern on the dielectric sheet. As a method of forming an inner electrode pattern, for example, screen printing, gravure printing, or the like may be used.

Next, a predetermined number of dielectric sheets for the second outer layer portion 112 on which no inner electrode pattern is printed are laminated.

Dielectric sheets for the inner layer portion 100 on which inner electrode patterns are printed are sequentially laminated thereon.

At this time, a dielectric paste for thickness correction may be applied as needed to a position corresponding to each side gap portion as appropriate.

Further, a conductive material for forming the thin portion 302 may be added to the dielectric paste for thickness correction.

A predetermined number of dielectric sheets for the first outer layer portion 111 on which no inner electrode pattern is printed are laminated thereon. Thus, a laminated sheet is produced.

Next, the laminated sheet is pressed in the lamination direction by, for example, an isostatic press or the like to produce a laminated block. The laminated block is cut into a predetermined size to cut out a multilayer chip. At this time, corner portions and ridge portions of the multilayer chip are rounded by, for example, barrel polishing or the like. Next, the multilayer chip is fired to produce the multilayer body 10. The firing temperature is, for example, preferably about 900° C. or more and about 1400° C. or less, although it depends on the materials of the dielectric and the inner electrode.

Next, the first end surface LS1 of the multilayer body 10 is immersed in a conductive paste, which is an electrode material for a base electrode, with, for example, a dip method so that the conductive paste for the first base electrode 415 is applied to the first end surface LS1. Similarly, the second end surface LS2 of the multilayer body 10 is immersed in a conductive paste, which is an electrode material for a base electrode, with, for example, a dip method so that the conductive paste for the second base electrode 425 is applied to the second end surface LS2. Thereafter, the conductive paste is fired, and thus the first base electrode 415 and the second base electrode 425, which are fired layers, are formed. The firing temperature is, for example, preferably about 600° C. or more and about 900° C. or less.

As described above, the first base electrode 415 and the second base electrode 425 which are resin layers may be formed by applying a conductive paste including a conductive particle and a thermosetting resin with an applying method, and firing the conductive paste, or the first base electrode 415 and the second base electrode 425 which are thin films may be formed with a thin film forming method such as, for example, a sputtering method or a vapor deposition method.

Thereafter, the first inner plating layer 416 is formed on a surface of the first base electrode 415, and the second inner plating layer 426 is formed on a surface of the second base electrode 425. Subsequently, the first front plating layer 417 is formed on a surface of the first inner plating layer 416, and the second front plating layer 427 is formed on a surface of the second inner plating layer 426.

The above-described multilayer ceramic capacitor 1 is obtained by the processes above.

EXAMPLES

Examples and comparative examples will be described with reference to FIG. 5.

The following multilayer ceramic capacitors were produced as an example and a comparative example.

Chip size: about 1.6 mm (L)×about 0.8 mm (W)×about 0.8 mm (T)

Thickness of main facing portion of inner electrode: about 0.6 μm

The number of inner electrodes: 500

Thickness of dielectric layer: about 0.8 μm

The number of dielectric layers: 500

Thickness of thin portion: about 0.2 μm

The following characteristics are listed for the examples and the comparative examples in FIG. 5.

Whether or not a dielectric paste for thickness correction is applied to the position corresponding to the side gap portion Bending amount of inner electrode 30 (length a/b in FIG. 3)

Presence or absence of the thin portion 302

Average thickness (thickness of thin portion/thickness of main facing portion) when the thin portion 302 is present Average length (W2/W3 in FIG. 3) when the thin portion 302 is present Quality Evaluation Result The average thickness and the average length each were an average of 10 points adjacent to each other.

The quality was evaluated according to the following criteria.

Electrical characteristics failure rate:

The insulation resistance (IR) was measured for 100 chips after firing, and chips with Log IR<about 5 were counted as short-circuit defective chips.

One or more chips out of 100 chips being defective were determined as "defective". Others were determined as "good".

Structural flaw occurrence rate after firing:

Appearance of 100 chips after firing was observed on six surfaces under a stereo microscope to confirm the presence or absence of a crack around the outer layer. A chip having a crack in the outer layer is determined as a defective chip, and the number of the defective chips was counted.

One or more chips out of 100 chips being defective were determined as "defective". Others were determined as "good".

As illustrated in FIG. 5, the electrical characteristics failure or the structural flaw after firing occurred in a chip having no thin portion regardless of whether the dielectric paste for thickness correction was applied or not.

In contrast, in a chip including the thin portion, neither the electrical characteristics failure nor the structural flaw occurred after firing.

As the chip size is larger such as about 1.6×about 0.8 mm or more, for example, and a width of the side gap portion is narrower such as about 75 μm or less, for example, the electrical characteristics failure or the structural flaw after firing is more likely to occur. In a multilayer ceramic capacitor having the chip size above, an advantageous effect of the configuration of the present example embodiment is likely to be significantly provided.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:

a multilayer body including a dielectric layer and an inner electrode alternately laminated; wherein the multilayer body includes a first main surface and a second main surface opposed to each other in a lamination direction, a first side surface and a second side surface opposed to each other in a width direction orthogonal or substantially orthogonal to the lamination direction, and a first end surface and a second end surface opposed to each other in a length direction orthogonal or substantially orthogonal to the lamination direction and the width direction;

the multilayer body includes an outer electrode on each of the first end surface and the second end surface, the outer electrode being coupled to the inner electrode;

the inner electrode includes a main facing portion and a thin portion;

a thickness of the thin portion is smaller than a thickness of the main facing portion;

the thin portion extends from an end portion of the main facing portion in the width direction to the first side surface or the second side surface; and the thin portion has a length of about 10% or more of a length from the end portion to the side surface adjacent to the end portion.

2. The multilayer ceramic capacitor according to claim 1, wherein the thickness of the thin portion is about 40% or less of the thickness of the main facing portion.

3. The multilayer ceramic capacitor according to claim 1, wherein the thickness of the thin portion is about 30% or less of the thickness of the main facing portion.

4. The multilayer ceramic capacitor according to claim 1, wherein the thin portion has a length of about 20% or more of a length from the end portion to the side surface adjacent to the end portion.

5. The multilayer ceramic capacitor according to claim 1, wherein continuity of the thin portion is lower than continuity of the main facing portion.

6. The multilayer ceramic capacitor according to claim 1, wherein the multilayer body includes first and second side gap portions not including the inner electrode.

7. The multilayer ceramic capacitor according to claim 1, wherein the thickness of the thin portion is about 20% or less of the thickness of the main facing portion.

8. The multilayer ceramic capacitor according to claim 1, wherein the thickness of the thin portion is about 40% or less of the thickness of the main facing portion.

9. The multilayer ceramic capacitor according to claim 1, wherein the thin portion is curved toward the first main surface.

10. The multilayer ceramic capacitor according to claim 1, wherein the thin portion extends linearly or substantially linearly.

11. The multilayer ceramic capacitor according to claim 1, wherein the inner electrode includes Ni as a main component.

12. The multilayer ceramic capacitor according to claim 1, wherein the inner electrode includes Cu, Ag, Pd, or Au, or an alloy including at least one of Cu, Ag, Pd, or Au.

13. The multilayer ceramic capacitor according to claim 1, wherein the inner electrode includes a first metal component and a second metal component different from the first metal component and defining a solid solution layer.

14. The multilayer ceramic capacitor according to claim 13, wherein the first metal component includes Ni.

15. The multilayer ceramic capacitor according to claim 13, wherein the second metal component includes Sn, In, Ga, Zn, Bi, Pb, Fe, V, Y or Cu.

16. The multilayer ceramic capacitor according to claim 13, wherein the second metal component includes Sn.

17. The multilayer ceramic capacitor according to claim 13, wherein a thickness of the solid solution layer is about 1 nm or more and about 20 nm or less.

18. The multilayer ceramic capacitor according to claim 13, wherein the solid solution layer includes a central solid solution layer and an outer solid solution layer;

the second metal component of the central solid solution layer includes a molar amount of about 0.008 or more and about 0.025 or less relative to a total molar amount of the first and second metal components; and the second metal component of the outer solid solution layer includes a molar amount of about 0.008 or more and about 0.025 or less relative to a total molar amount of first and second metal components.

19. The multilayer ceramic capacitor according to claim 1, wherein the thickness of the thin portion is about 40% or less of the thickness of the main facing portion; and continuity of the thin portion is lower than continuity of the main facing portion.

20. A multilayer ceramic capacitor, comprising:

a multilayer body including a dielectric layer and an inner electrode alternately laminated; wherein the multilayer body includes a first main surface and a second main surface opposed to each other in a lamination direction, a first side surface and a second side surface opposed to each other in a width direction orthogonal or substantially orthogonal to the lamination direction, and a first end surface and a second end surface opposed to each other in a length direction orthogonal or substantially orthogonal to the lamination direction and the width direction;

the multilayer body includes an outer electrode on each of the first end surface and the second end surface, the outer electrode being coupled to the inner electrode;

the inner electrode includes a main facing portion and a thin portion;

a thickness of the thin portion is smaller than a thickness of the main facing portion;

the thin portion extends from an end portion of the main facing portion in the width direction to the first side surface or the second side surface; and the thin portion is curved toward the first main surface, and an entirety of the main facing portion is linear or substantially linear.

* * * * *